United States Patent [19]

Lentz et al.

[11] Patent Number: 5,072,390
[45] Date of Patent: Dec. 10, 1991

[54] ADAPTIVE CONTROL OF AN AUTOMATIC TRANSMISSION

[75] Inventors: Carl A. Lentz, Mooresville; Jeffrey K. Runde, Indianapolis; Joseph H. Hunter, Carmel; Christopher R. Wiles, Indianapolis, all of Ind.

[73] Assignee: General Motors Corporation, Detroit, Mich.

[21] Appl. No.: 456,904

[22] Filed: Dec. 26, 1989

[51] Int. Cl.$^5$ ............................................. B60K 41/02
[52] U.S. Cl. .................................... 364/424.1; 74/866
[58] Field of Search ............... 364/424.1; 74/861, 866, 74/867

[56] References Cited

U.S. PATENT DOCUMENTS

| | | | |
|---|---|---|---|
| 4,283,970 | 8/1981 | Vukovich | 74/866 |
| 4,653,350 | 3/1987 | Downs et al. | 74/866 |
| 4,707,789 | 11/1987 | Downs et al. | 364/424.1 |
| 4,742,461 | 5/1988 | Eschrich et al. | 364/424.1 |
| 4,875,391 | 10/1989 | Leising et al. | 74/866 |
| 4,913,004 | 4/1990 | Panoushek et al. | 364/424.1 |
| 4,919,012 | 4/1990 | Bolz | 364/424.1 |
| 4,928,557 | 5/1990 | Takada et al. | 74/866 |
| 4,942,530 | 7/1990 | Boda et al. | 364/424.1 |

Primary Examiner—Salvatore Cangialosi
Attorney, Agent, or Firm—Mark A. Navarre

[57] ABSTRACT

In an automatic transmission upshifting is controlled by ramping down the pressure in an off-going clutch associated with a high speed ratio and increasing the pressure in an on-coming clutch associated with a lower speed ratio. The on-coming clutch has commanded pressure at a maximum value for an initial fill time, a lower increasing ramp value during the ramp of the off-going clutch until the on-coming clutch starts to engage, and then a closed-loop control until the clutch reaches a synchronous speed. The closed-loop control parameter is on-coming clutch slip which is controlled to a calculated slip speed profile. Parameters for controlling the quality of a shift such as on-coming clutch initial pressure, off-going clutch initial pressure and on-coming clutch fill time are automatically adjustable during vehicle use to correct shift aberrations which degrade shift quality. A fast adjustment mode is in effect initially to calibrate the transmission control for the engine and vehicle. After a smooth shift is obtained only small adjustments are allowed.

15 Claims, 15 Drawing Sheets

| RANGE | CLUTCHES APPLIED | | | | |
|---|---|---|---|---|---|
| | C1 | C2 | C3 | C4 | C5 |
| FWD 1 | X | | | | X |
| 2 | X | | | X | |
| 3 | X | | X | | |
| 4 | X | X | | | |
| 5 | | X | X | | |
| 6 | | X | | X | |
| REV 1 | | | X | | X |

ADAPTIVE CONTROL OF AN AUTOMATIC TRANSMISSION

FIELD OF THE INVENTION

This invention relates to a method of transmission control, and more particularly, to an adaptive method of adjusting shift parameters on the basis of the quality of past shifts.

BACKGROUND OF THE INVENTION

Generally, a motor vehicle automatic transmission includes a number of gear elements coupling its input and output shafts, and a related number of torque establishing devices such as clutches and brakes which are selectively engageable to activate certain gear elements for establishing a desired speed ratio between the input and output shafts. The brake can be of the band type or disk type; engineering personnel in the automotive art refer to disc type brakes in transmissions as "clutches" or "reaction clutches". As used herein, the terms "clutches" and "torque transmitting devices" will be used to refer to brakes as well as clutches.

The input shaft is connected to the vehicle engine through a fluid coupling, such as a torque converter, and the output shaft is connected directly to the vehicle wheels. Shifting from one forward speed ratio to another is performed in response to engine throttle and vehicle speed, and generally involves releasing or disengaging the clutch (off-going) associated with the current speed ratio and applying or engaging the clutch (on-coming) associated with the desired speed ratio.

The speed ratio is defined as the transmission input speed or turbine speed divided by the output speed. Thus, a low gear range has a high speed ratio and a higher gear range has a lower speed ratio. To perform an upshift, a shift is made from a high speed ratio to a low speed ratio. In the type of transmission involved in this invention, the upshift is accomplished by disengaging a clutch associated with the higher speed ratio and engaging a clutch associated with the lower speed ratio, to thereby reconfigure the gear set to operate at the lower speed ratio. Shifts performed in the above manner are termed clutch-to-clutch shifts and require precise timing in order to achieve high quality shifting.

The quality of shift depends on the cooperative operation of several functions, such as pressure changes and the timing of control events. Certain parameters in the shift control can be recognized as key elements in determining the shift quality. The vehicle type and the engine characteristics are very important factors in the shift operation and influence the correct selection of the parameters. In many cases, especially in truck applications, the vehicle and engine to be used with the transmission are not known to the manufacturer of the transmission. Moreover, manufacturing tolerances in each transmission, changes due to wear, variations in oil quality and temperature, etc., lead to shift quality degradation which can be overcome by an adaptive scheme for adjusting the parameters, whereby as the vehicle is driven, the shift quality is analyzed and the required adjustments are calculated and implemented for subsequent shifts.

Large calibration adjustments may need to be made for each shift of a newly manufactured transmission. It is important to provide the capability for the transmission control to rapidly adjust itself to its system configuration when it is first operated as well as to maintain a continuous update capability.

SUMMARY OF THE INVENTION

It is therefore an object of the invention to provide a method of adaptively controlling a shift in an automatic transmission wherein a transmission aberration during a shift is diagnosed, and the method has the capability to fully (or optionally partially) correct the operation on the next shift of the same type.

It is a further object to provide such a method which is capable of making large corrections initially and is limited to small incremental changes thereafter.

Another object of the invention is to specifically apply the adaptive control principles to an upshift.

The invention is carried out by monitoring transmission input and output speeds during a shift and identifying departures from acceptable speed patterns and the times during the shift when the departures occur. For closed-loop control, the relationship of commanded clutch pressures are similarly monitored. Each particular type of departure calls for a particular remedy, and a suitable adjustment is calculated based on the times and/or the commanded pressures at certain times, the adjustment being implemented by changing one or more initial conditions for the next shift of the same type. The adjustments may have to be large to make a full or significant partial correction at the next shift. Once the corrections are made, the continuing ability to make a large change is undesirable because road or system noise may distort the speed signals to give false indications of a shift aberration which would trigger a large adjustment To avoid that problem, once the initial corrections have resulted in a satisfactory shift quality, the large corrections are inhibited and only small adjustments are permitted.

BRIEF DESCRIPTION OF THE DRAWINGS

The above and other advantages of the invention will become more apparent from the following description, taken in conjunction with the accompanying drawings, wherein like references refer to like parts and wherein:

FIG. 1b is a diagram illustrating the clutch engagements required to establish the various speed ratios of the transmission depicted in FIG. 1a.

FIGS. 2 and 3a-3b are flow diagrams representative of computer program instructions executed by the computer based controller of FIG. 1a in carrying out the shift control of the transmission.

DESCRIPTION OF THE INVENTION

Figure 1A:
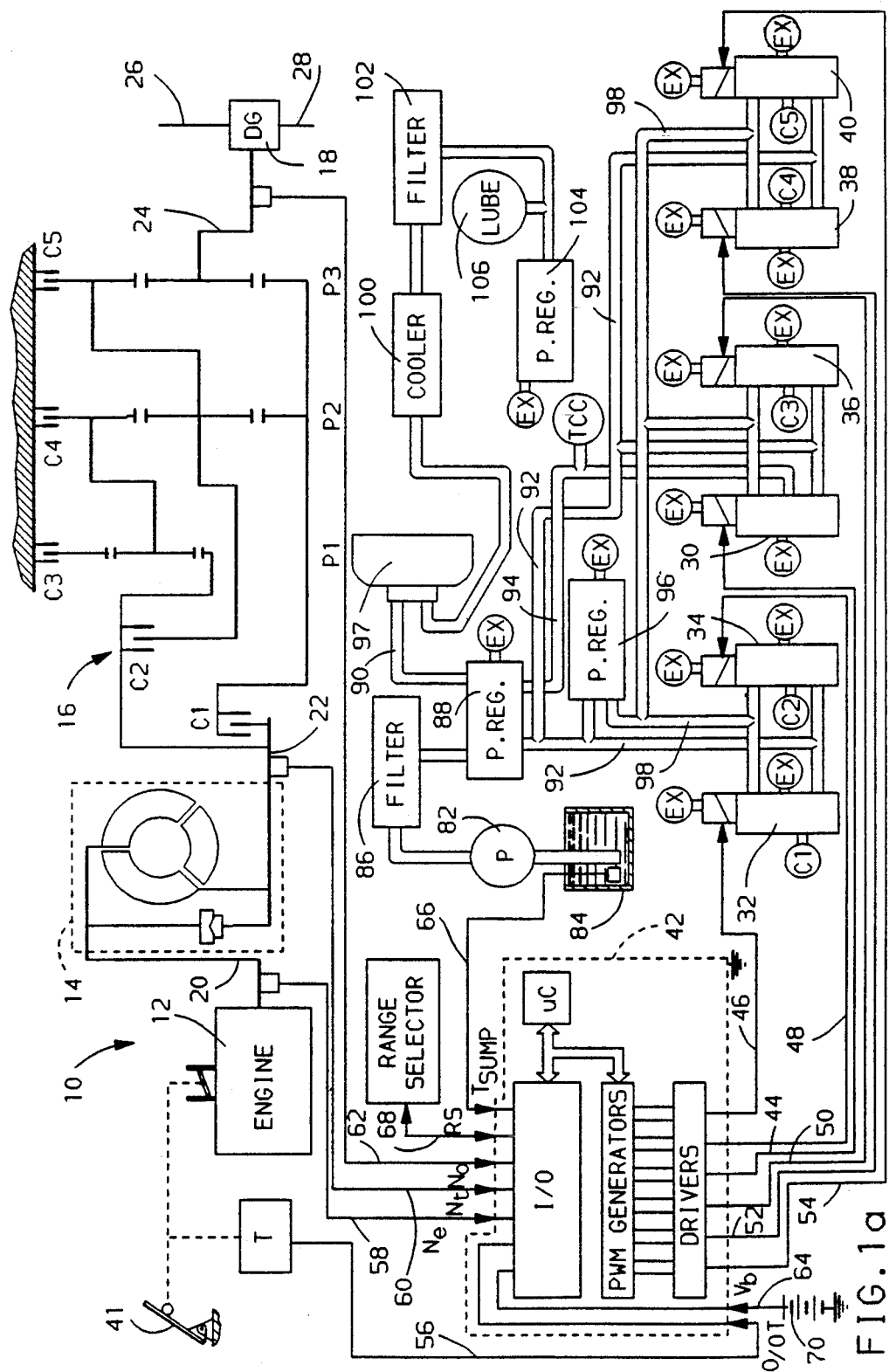
FIG. 1a is a system diagram of a fluid operated motor vehicle transmission, including several solenoid operated fluid pressure control valves, and a computer-based control unit for carrying out the control technique of this invention.

Referring now to the drawings, and more particularly to FIG. 1a, the reference numeral 10 generally designates a motor vehicle drive train including a throttled internal combustion engine 12, a fluidic torque converter 14, a six-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gearset is connected to a pair of drive wheels (not shown) via the prop shafts 26 and 28.

Gear shifts are accomplished by selectively engaging and disengaging brakes and clutches, herein called torque transmitting devices or clutches. These clutches are actuated by hydraulic pressure and upon engagement require a fill time before torque is transmitted between a driving and a driven friction element.

The speed and torque relationships between the engine 12 and the drive wheels of the vehicle are controlled by a fluid operated torque converter clutch, designated TCC, and five fluid operated transmission clutches, designated C1-C5. The torque converter clutch TCC is selectively engaged by the solenoid operated control valve 30 to mechanically connect the impeller I and turbine T of torque converter 14. The clutches TCC, C1, C2, C3, C4, C5 are selectively engaged and disengaged by the solenoid operated control valves 30, 32, 34, 36, 38, 40 according to the diagram shown in FIG. 1b, to selectively establish a desired transmission speed ratio. The illustrated transmission gear set provides one reverse ratio and six forward ratios, and is described in detail in the U.S. Pat. No. 4,070,927 to Polak, issued Jan. 31, 1978, and assigned to the assignee of the present invention. An operator manipulated accelerator pedal 41 positions the engine throttle for controlling the engine power output.

The operation of the solenoid operated control valves 30-40 is controlled by a computer-based control unit 42 via lines 44-54 in response to various input signals representative of system parameters. Such inputs include an engine throttle position signal %T on line 56, an engine output shaft speed signal Ne on line 58, a torque converter output shaft speed signal Nt on line 60, a transmission output shaft speed signal No on line 62, a system supply voltage signal Vb on line 64, a transmission fluid temperature signal Tsump on line 66 and an operator range selector position signal RS on line 68. The system voltage is supplied by the storage battery 70, and the input signals are obtained with conventional electrical transducers such as potentiometers, thermistors and magnetic speed pickups.

Internally, the control unit 42 comprises a number of conventional devices including a microcomputer (uC) with internal clock and memory, an input/output device (I/O) and an array of PWM generators (PWM) and drivers (DR). As indicated below, a PWM generator and a driver (DR) are dedicated to each solenoid control valve 30-40. The PWM outputs are delivered to the respective drivers (DR) and are used to energize the respective solenoid control valves. The duty cycle of the PWM outputs determine the hydraulic pressure supplied by the solenoid control valves, with a low percent duty cycle yielding a low pressure and a high percent duty cycle yielding a high pressure for a normally closed valve.

The hydraulic circuit of transmission 16 includes a positive displacement pump 82 for supplying pressurized hydraulic fluid from the sump or reservoir 84, to the clutches TCC and C1-C5 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit, as designated by the bubble 106.

The fluid in line 92, generally referred to as main or line pressure, is supplied as an input to the clutch control valves 30-40, and also to the control pressure regulator valve 96. The control pressure regulator valve 96 develops a somewhat lower pressure in line 98, referred to herein as the control pressure, such pressure being directed to the solenoid of each control valve 30-40.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lock-up mode.

Figures 1B, 2:
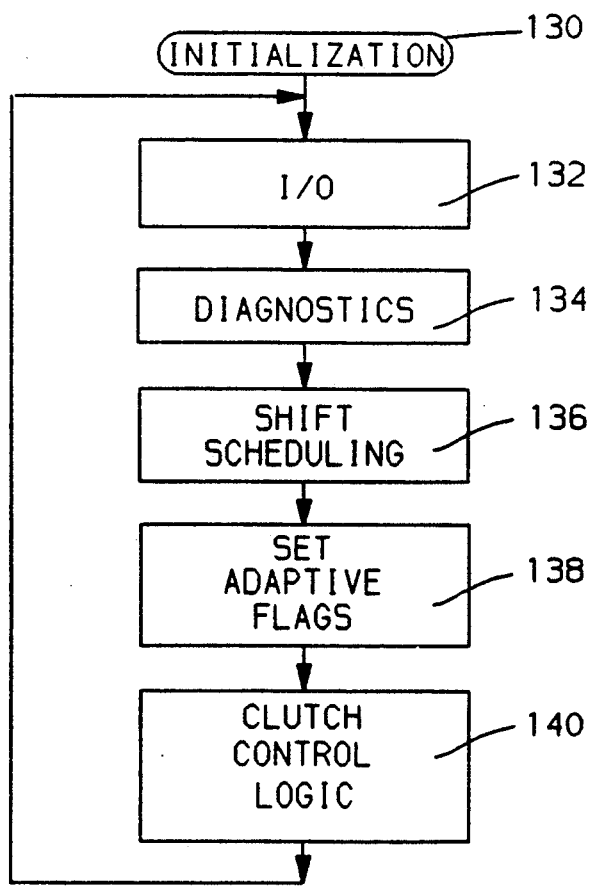

FIGS. 2, 3a-3b and 6, 8, 10 and 12 are flow diagrams representative of computer program instructions executed by the computer-based control unit 42 of FIG. 1 in carrying out the shift control technique of this invention. In the description of the flow diagrams other than FIG. 2, the functional explanation marked with numerals in angle brackets, <nn>, refers to blocks bearing that number.

FIG. 2 represents an executive or main loop program which directs the sequential execution of various subroutines. Block 130 designates a series of instructions executed at the initiation of each period of vehicle operation for setting the various timers, registers and variable values of control unit 42 to predetermined initial values Thereafter, the blocks 132-140 are sequentially and repeatedly executed as indicated by the flow diagram lines Block 132 reads the various input signal values and outputs the required control signals to the PWM generators and drivers for solenoid controlled valves 30-40. Blocks 134-138 contain diagnostic, shift scheduling, and adaptive flag logic. The clutch control logic block 140 analyzes the various system input signals described above in reference to FIG. 1a, develops pressure command signals PCMD for application to the solenoid operated control valves at the next execution of block 132, and computes adaptive corrections based on the adaptive flags at shift completion. Block 140 also effects pulse-width-modulation of the solenoid drive voltage to carry out the pressure commands for specific shift operations. Block 140 is detailed in the flow chart of FIGS. 3a-3b.

Figure 3A:
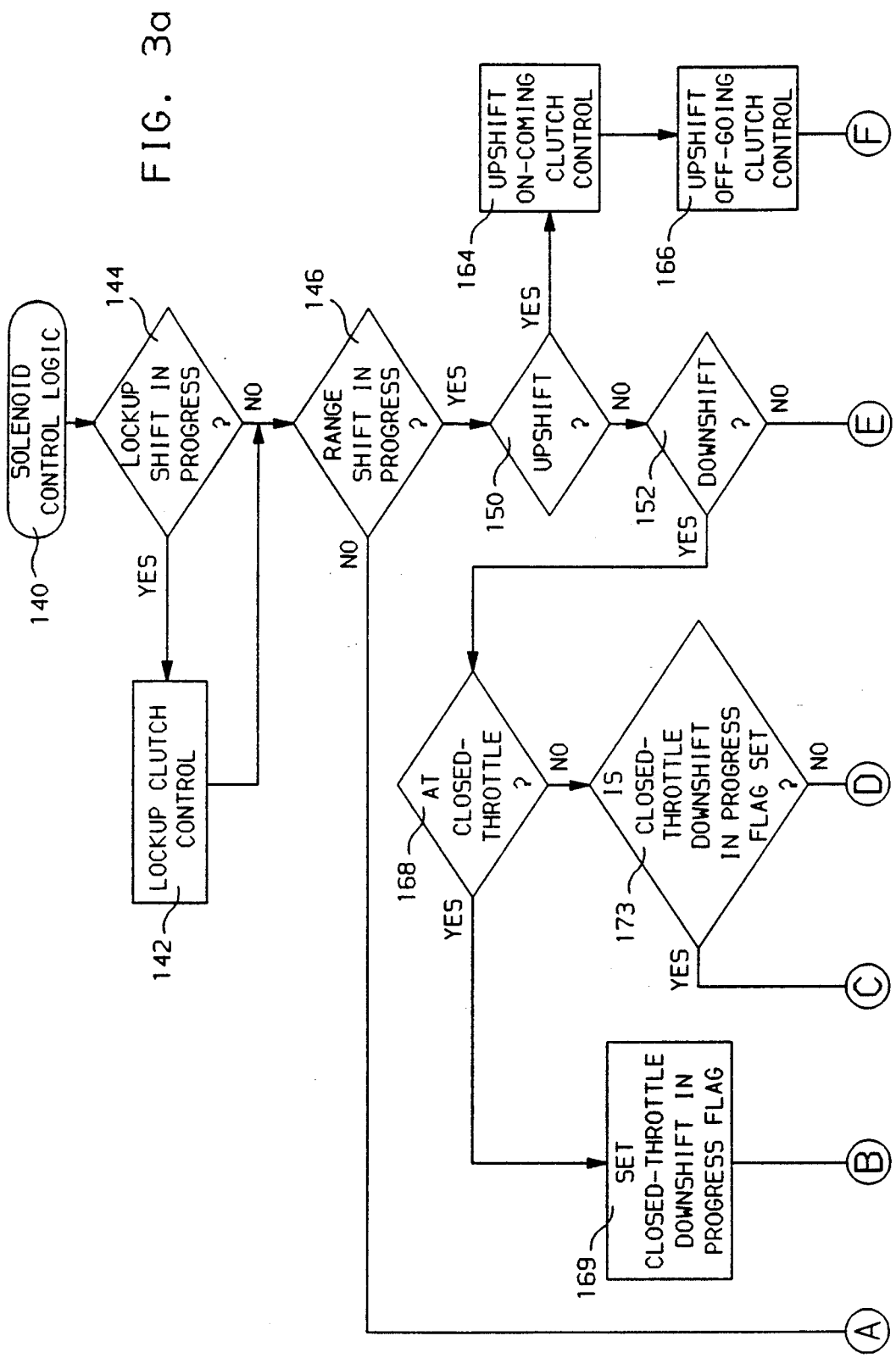
Figure 3B:
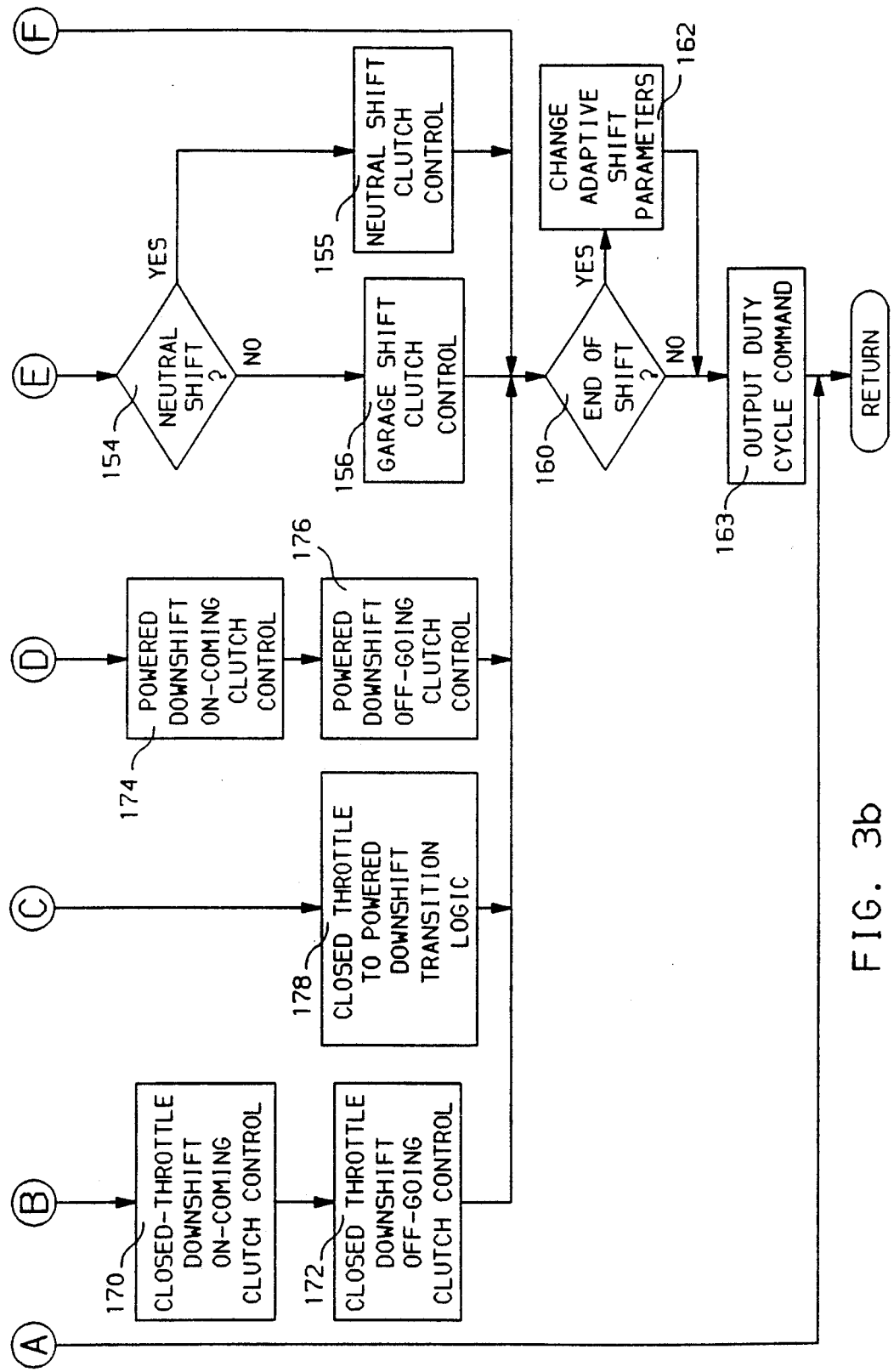

The flow diagram of FIGS. 3a-3b sets forth the program for making decisions as to the type of range shift in progress, if any, and determines the specific control for the on-coming and the off-going clutches. The program also checks whether a shift has performed within specifications, and if not, certain shift parameters are changed at shift completion according to predefined adaptive logic to correct the shift. First, lockup clutch control is executed <142> if a lockup shift is in progress <144>. Then it is determined (from the shift schedule) whether a range shift is in progress <146>. If not, the clutch control logic is exited. If a range shift is in progress <146>, it is determined whether it is an upshift <150>, a downshift <152>, a neutral shift <154>, or a garage shift <156>. A garage shift is a shift from neutral to either drive or reverse, or a shift from drive to reverse or from reverse to drive The control flows from either the upshift, downshift, neutral shift or the garage shift block to the end-of-shift test <160>. Once the shift is completed <160>, adaptive shift parameters are changed if required <162> and the duty cycle command is output <163>. If the shift has not ended <160>, the duty cycle command is output <163> before returning to the main loop of FIG. 2.

If an upshift is indicated <150>, the upshift on-coming clutch control <164> and the upshift off-going clutch control <166> are activated. If a downshift is indicated <152>, it is next decided whether it is a closed throttle downshift or a powered downshift <168>. If it is closed throttle, a closed throttle in progress flag is set <169>, the closed throttle on-coming clutch control is activated <170> and the closed throttle off-going clutch control is activated <172>. If the downshift is not at closed throttle <168>, the closed throttle flag is checked <173>. If the flag is not set, the powered downshift on-coming clutch control <174> and the powered downshift off-going clutch control <176> are activated. If the closed throttle flag is set <173>, the throttle opened during the course of the closed throttle downshift and a transition to powered downshift may be necessary; in such case, the appropriate transition logic is invoked <178>. If the shift is a neutral shift <154>, the neutral shift clutch control executes shifts from drive to neutral or from reverse to neutral <155>.

Each control phase operates by setting pressures, pressure increments, times or other values to predefined calibrated values which are herein generally called "set", "preset", "given" or "certain" values. Each such value is chosen from a table of calibrated values for each specific transmission condition, throttle range and shift type. Thus, different values are supplied for upshift, downshift, etc. as well as each range shift, e.g., 1-2, 2-1, 4-3, 5-4, etc. Converter and lockup modes may also require separate sets of calibration values.

Figure 4:
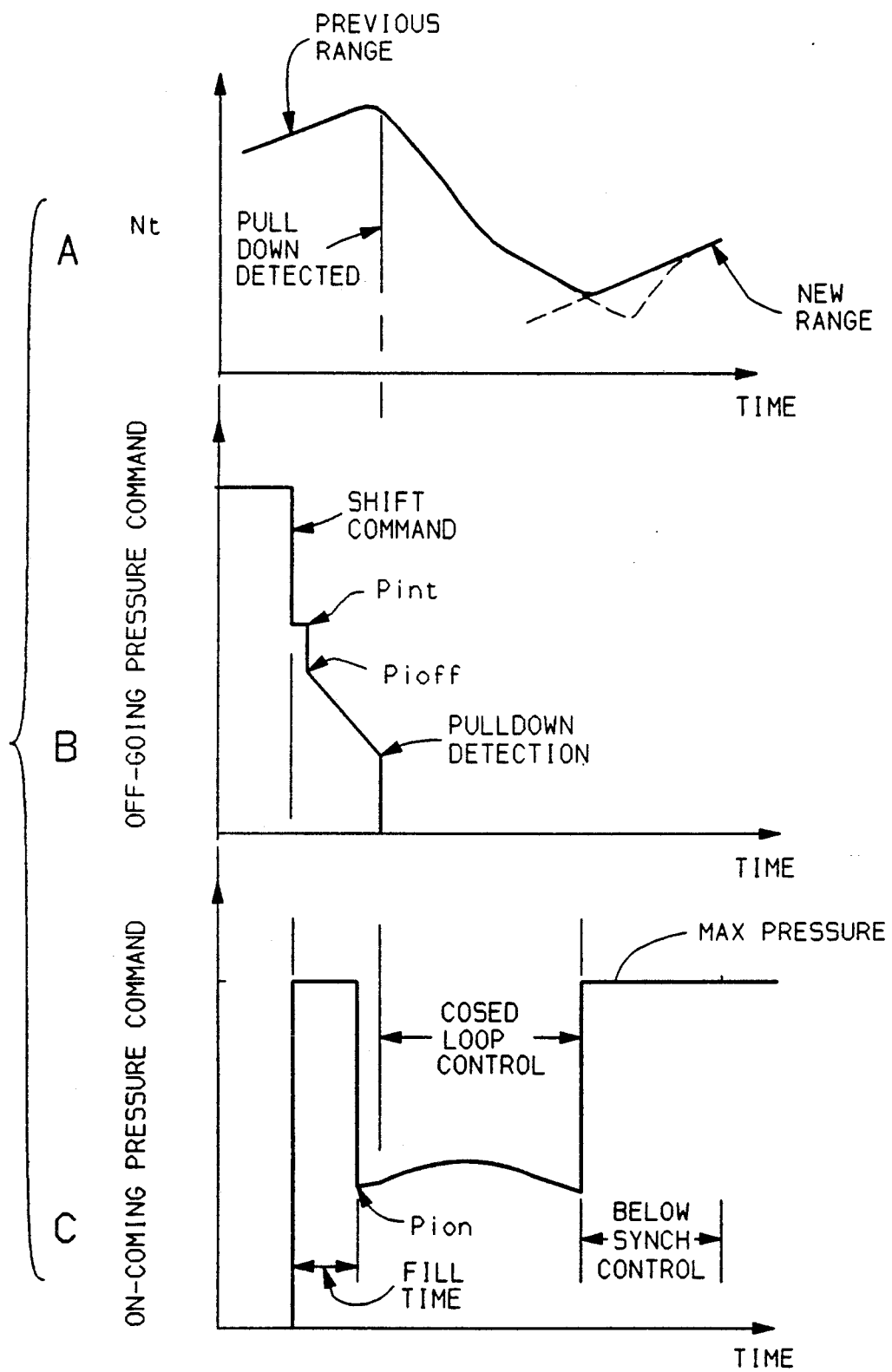
FIG. 4 illustrates typical turbine speed, off-going pressure command and on-coming pressure commands for a clutch-to-clutch upshift.

FIG. 4, graphs A, B, and C detail the controlled clutch pressure for an upshift as well as the turbine speed or input speed. Graph A depicts the turbine speed versus time, graph part B depicts the commanded pressure versus time for the off-going clutch, and graph C depicts the commanded pressure versus time for the on-coming clutch. Graph A curve is typical for the case of increasing vehicle speed prior to shift initiation and indicates the turbine speed during the first range, the speed decrease during shifting, and increase again at a lower level after shifting. The peak of the turbine speed is due to the slowing action of the on-coming clutch, causing slip of the off-going clutch, and is indicative of "turbine pulldown". Turbine pulldown is detected by sensing when the turbine speed falls a set amount below the output speed multiplied by the higher speed ratio. The speed after shifting is "synchronous speed", i.e., the turbine speed (Nt) equals the output speed (No) times the lower speed ratio (SR) or Nt=No*SR.

Referring to graphs B and C, it may be observed that initially, at the time of the shift command, the off-going pressure is reduced to an intermediate value, Pint, for a brief time and is then reduced to an initial value, Pioff, and then ramps down until off-going clutch slip (or turbine pulldown) is detected and then drops to zero. The brief intermediate value, Pint, is effective to reduce clutch pressure undershoot caused by solenoid dynamics.

For the on-coming clutch, graph C shows that maximum pressure is commanded for a fill time. The fill time allows nearly complete stroking of the clutch plates and obtains clutch torque capacity. Then the command pressure drops to an initial value, Pion, and ramps up slowly until it causes turbine pulldown. The combination of the on-coming upward ramp and the off-going downward ramp results in a torque transition from the off-going to the on-coming clutch. Then the off-going clutch is released, and the on-coming clutch control enters a closed-loop control period wherein the pressure is adjusted to maintain the on-coming clutch slip close to a calculated slip profile. When the turbine speed, Nt, reaches synchronous speed, the pressure command is increased to maximum value to fully engage the clutch and complete the shift.

The upshift process has several features which contribute to smooth and efficient operation. The on-coming and off-going pressure ramp commands reduce clutch timing sensitivity to the initial pressure commands. Thus, variations in clutches due to temperature or other factors do not impose critical demands on the timing of torque transition because the two ramps can continue for a variable time, subject to a limit value, so that the actual assumption of torque by the on-coming clutch determines the time of transition. Also, the immediate release of the off-going clutch following pulldown detection reduces clutch tie-up which might result in a braking action. The closed-loop control of the on-coming clutch reduces shift variation and the end-of-shift torque disturbance.

Figure 5:
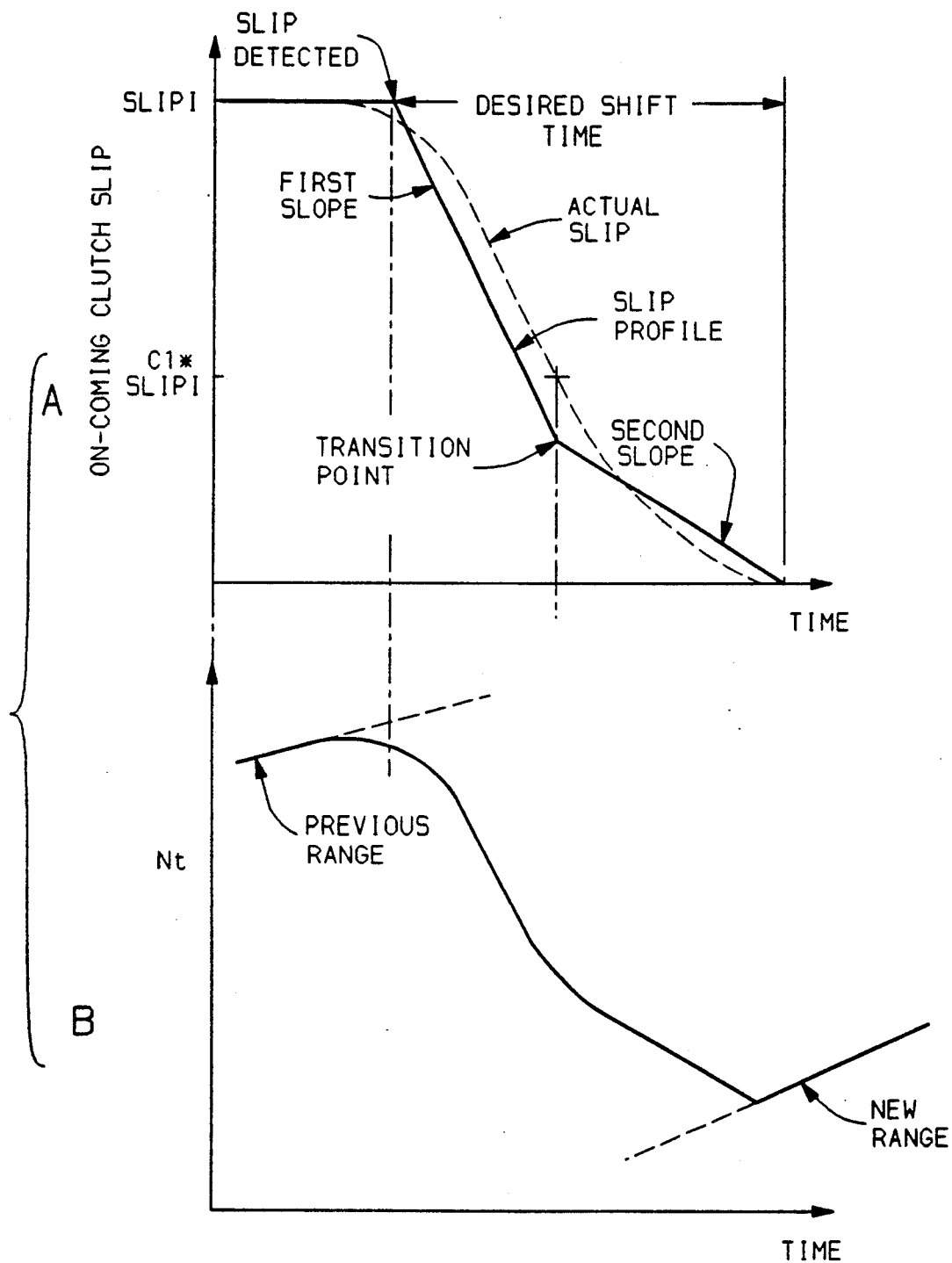
FIG. 5 is a slip diagram for the closed-loop operation of the on-coming clutch.

The closed-loop profile control is better explained with reference to FIG. 5, graph A, which shows the on-coming clutch slip speed profile in solid lines and actual slip speed in dashed lines. Slip speed is determined by comparing the turbine speed to the output speed. Specifically, slip speed is the absolute value of the difference (times a conversion factor K) between turbine speed and the product of the output speed and the speed ratio of the higher or new range, or algebraically, $$SLIP = ABS\{K^*[Nt - (No^*SR(new))]\}.$$

Thus, as soon as a shift command is issued, there is slip in the on-coming clutch. The initial slip speed, SLIPI, is the slip value at the initiation of closed loop. The slip speed profile begins at that point and decreases at a fixed rate, called the first slope. Then at a determined point, the rate reduces to a second slope. The slopes are chosen so that, ideally, the actual slip speed can be made to smoothly go to zero within a given time period. The second slope is less steep than the first slope and reduces end of shift torque disturbance by more closely matching the acceleration rates on both sides of the on-coming clutch. By using slip speed as the control target, both turbine and output speeds are taken into account when controlling the shift duration.

To determine the slopes of the slip profile, three constants C1, C2 and C3 are defined. The constant C1 is a fraction of SLIPI at which the second slope begins; i.e., if SLIP=<C1*SLIPI, the slope changes to slope 2. The constant C2 is the desired time to utilize the first slope. The constant C3 is the desired overall closed-loop time. The constants C2 and C3 are used only for the slope calculation and not for direct timing purposes. The first and second slopes SLOPE1, SLOPE2 are defined as:

SLOPE1=[SLIP*I*−(C1*SLIP*I*)]/C2; and
SLOPE2=C1*SLIP*I*/(C3−C2).

The arrival at synchronization speed is determined by making several measurements in consecutive control loops. This assures that true synchronization has been achieved and maintained. If synchronization is assured, full clutch pressure is immediately applied. In the event the turbine speed goes below the synchronization speed, as shown in dashed lines in FIG. 4, it is smoothly pulled up to synchronization speed by ramping the pressure up over a fixed period. This feature prevents full application of the on-coming clutch (during closed throttle shifts) when the on-coming clutch is not completely stroked. The "below sync" condition can only result when turbine pulldown is achieved through a "neutral" condition caused by lack of on-coming clutch capacity The ramp application of the on-coming clutch will significantly reduce end-of-shift torque disturbance.

Adaptive Control

Adaptive control adjusts certain parameters for each type of shift independently of other types. That is, a 1-2 upshift is treated separately from a 3-4 upshift, and the shift quality of each is separately monitored and the parameters for each type are individually adjusted and stored. The process of adapting the parameters for a particular type of shift is on-going, and proceeds during each shift of that type independently of the other types of shifts.

At the end of each completed shift, the block 62 sets adaptive parameters. This is accomplished in three phases: (1) diagnosing the shift to identify shift aberrations (generally recognized through aberrations in input and-/or output speed and pressure commands), (2) determining whether fast or slow adaptive adjustment is appropriate, and (3) calculating new parameter values for the next shift. If fast adaptive adjustment is appropriate, a parameter value is calculated, which is generally targeted to fully correct the aberration in the next shift. If slow adaptive adjustment is appropriate, the existing parameter is changed by a set increment. The system is capable of being programmed to make a partial correction in the fast adaptive mode and this is sometimes employed to avoid over-correction.

The distinction between fast and slow adaptive adjustment is based on the need to make potentially large adjustments when a new or rebuilt transmission is initially operated in a given vehicle/engine combination, as opposed to the need to make small updates due to clutch plate wear, engine performance degradation, oil viscosity degradation and the like during the life of the transmission. Initially, the electronic control is set to make fast adaptive adjustments for each type of shift. As soon as all the parameters are correctly adjusted for that type of shift, as evidenced by a shift wherein no aberrations are detected, the shift calibration is said to be "converged" to an optimal solution and a memory flag is set to restrict future shifts of that type to the slow adaptive mode. Once the control enters the slow mode, the correction authority is such that a misleading speed signal caused by road or system noise cannot trigger large adjustment of a control parameter.

The diagnosis of shift aberrations is accomplished by monitoring key shift quality indicators during the shift, and setting a memory flag whenever a certain speed change occurs under given conditions, a certain change of command pressure takes place, or certain corrective action has already been taken. Thus, these indicators. The desired pattern of the input and output speed function is established empirically and embodied in speed related flag definitions; e.g., the set time periods when flare, pulldown, clutch overlap, etc. occur. Departures from the desired pattern are deemed to be aberrations which result in setting the relevant flags. Then, by a logical assessment of the states of the several flags, the presence of a given aberration is determined and a suitable adjustment can then be calculated.

Adaptive Flags

PULLDOWN EARLY: Turbine speed pulldown is detected prior to a set time after the end of the fill period for a given number of times.

PULLDOWN LATE: Turbine speed pulldown is not detected prior to a greater set time from the end of the fill period.

FLARE DURING FILL: Flare is detected prior to another set time after the end of the fill period. Flare is defined for an upshift as the turbine speed exceeding the product of the output speed and the previous speed ratio plus a threshold constant or Nt>(No*SRold)+K.

FLARE AFTER FILL: Flare is first detected within a time window beginning a set time after the end of the fill period.

CLOSED-LOOP INCREASE: A closed-loop increase occurs when the commanded on-coming pressure at the first detected sync exceeds the initial closed-loop pressure command by a threshold amount.

CLOSED-LOOP DECREASE: A closed-loop decrease occurs when the commanded on-coming pressure at the first detected sync is below the initial closed-loop pressure command by a threshold amount.

CLUTCH OVERLAP: A decrease in turbine speed a threshold amount below the maximum turbine speed is detected before turbine pulldown for a set number of consecutive shifts.

BELOW SYNC: Turbine speed is below sync speed for a set number of times. Sync speed is defined for an upshift as the turbine speed being within a window below the product of the output speed and the target speed ratio.

HIGH TURBINE DECEL: Turbine acceleration is less than a set amount for a certain number of consecutive times prior to a set time following the fill period.

FILL TIME DECREASED: A memory flag that indicates that the fill time has been decreased The flag is set when the fill time is decreased and is reset when the set number of shifts occur as determined by a shift cycle counter, SCC.

FAST ADAPT OVERFILLS: A memory flag that indicates that corrections to overfills will use the fast adaptive calculation.

SHIFT CONVERGED: A memory flag set when a shift is completed which requires no adjustment and that indicates that the shift calibration has converged to an optimal solution.

CLOSED THROTTLE: A flag that is set when the throttle setting is less than a threshold amount at the time of the range shift command.

SHORT SHIFT: The time period between the detection of sync speed and the detection of off-going clutch slip is less than a threshold amount.

LONG SHIFT: The time period between the detection of sync speed and the detection of off-going clutch slip is greater than a threshold amount.

Fast Adaptive Algorithms

The parameters to be adjusted for quickly converging an upshift to the optimal calibration are: fill time, initial on-coming pressure, and initial off-going pressure Each of these parameters may be increased or decreased in accordance with the detected nature of the previous shift. A brief overview of the techniques for calculating the fast adaptive adjustments of the shift parameters are as follows:

FILL TIME: If turbine speed flare is observed, the correction is based on the time of maximum turbine speed flare, Tnmax. If flare is not observed, the correction is based on the time of turbine speed pulldown Tpd. In each case, the measurement is an estimate of the actual on-coming clutch fill time.

INITIAL ON-COMING PRESSURE MODIFICATION: The correction is based on the closed-loop error signal, which is an estimate of the change in the on-coming clutch pressure required to achieve the desired pull-down rate.

INITIAL OFF-GOING PRESSURE: If turbine speed flare is observed, the correction is based on the off-going pressure level where the flare was first observed. If flare is not observed, the correction is based on the off-going pressure level which allowed turbine pulldown to occur. In each case, the measurement is an estimate of the desired off-going pressure at the end of the on-coming clutch fill time.

Upshift Logic

The flow diagram of FIG. 6 details the CHANGE ADAPTIVE SHIFT PARAMETERS block 162 of FIG. 3b. If the shift cycle counter, SCC, is zero <200>, the FILL TIME DECREASED flag is reset <202>; otherwise SCC is decremented <204>. If the BELOW SYNC flag is set <206>, the initial on-coming pressure Pion is increased by a preset increment K1 <208> and the adaptive process ends for this shift. The below sync condition occurs when the on-coming clutch is underfilled and no engine power is present. When the off-going pressure is dropped, the transmission goes to neutral and the turbine speed will float down to engine idle speed. As it passes sync speed, the BELOW SYNC flag is set and the adaptive logic causes the on-coming pressure to be incremented at the next shift.

When the BELOW SYNC flag is not set <206> and the PULLDOWN EARLY flag is set <210>, the CLOSED THROTTLE flag is tested <212>. If it is not set, the Decrease Fill Time program <214> is entered. If CLOSED THROTTLE is set and HI TURBINE DECEL flag is set <216>, the Decrease Fill Time program is run, but if HI TURBINE DECEL is not set, the increase Pioff program <218> is run. If the PULL DOWN EARLY flag is not set <210>, the FAST ADAPTIVE OVERFILLS flag is reset <220> and the adapt Pion program <222> is run. Then, if the throttle is closed <224>, the adaptive loop ends; if the throttle is not closed, the FLARE DURING FILL flag is tested <226>. If FLARE DURING FILL is set, the increase Pioff program is run <218> but if not set, FLARE AFTER FILL is tested <228>. If the latter is set and FILL TIME DECREASED is set <230>, the initial off-going pressure Pioff is incremented by the value K1 <232>. If the fill time had not been decreased <230>, the Increase Fill Time program is run <234>. When there is no flare after fill <228>, and the OVERLAP flag is set <236> or PULL DOWN LATE is set and CLOSED-LOOP INCREASE (CLI) is not set <238>, the decrease Pioff program is run <240>.

Figure 7:
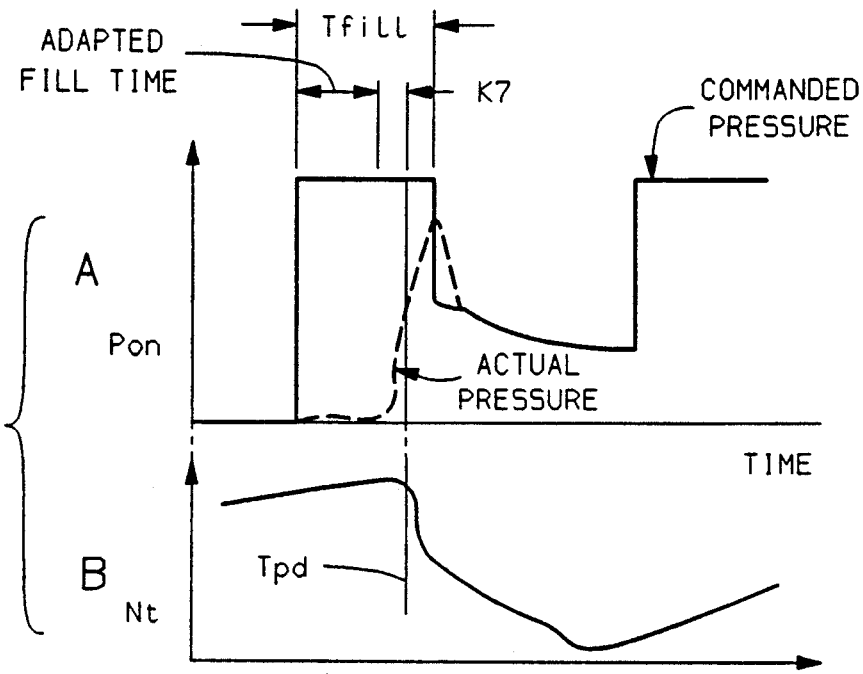
FIGS. 7, 9, 11, 13, 14 and 15 are graphs of clutch pressures and turbine speeds for the aberrant shift conditions being corrected by the method of the invention.

FIG. 7 graphs A and B show commanded and actual on-coming pressure Pon and turbine speed Nt, respectively, for a condition of early pulldown. The pulldown occurs at time Tpd, prior to the end of the fill period Tfill. The actual pressure goes high within the fill period to cause the early pulldown. The correction is made by reducing the fill time term Tfill to Tpd less an offset K7 to be sure of avoiding an overfill. A minimum amount K8 of fill time reduction is programmed to insure a minimum change in fill time. Thus, Tfill is updated according to the lesser of:

$$Tfill - Tpd - K7$$

or $$Tfill - K8$$

Figure 6A:
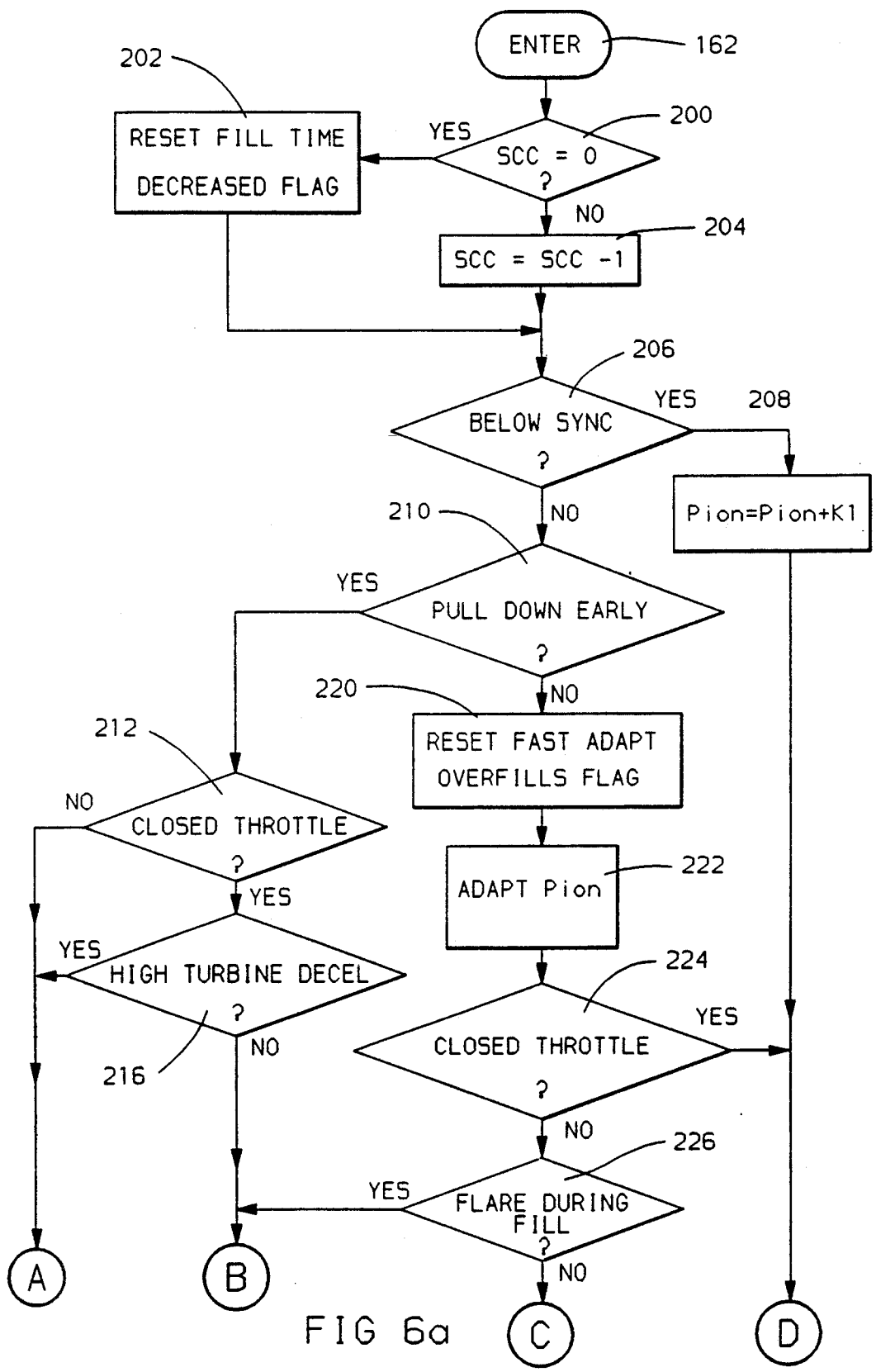
FIGS. 6A, 6B, 8, 10 and 12 are flow diagrams illustrating the adaptive shift control logic according to the invention.
Figure 6B:
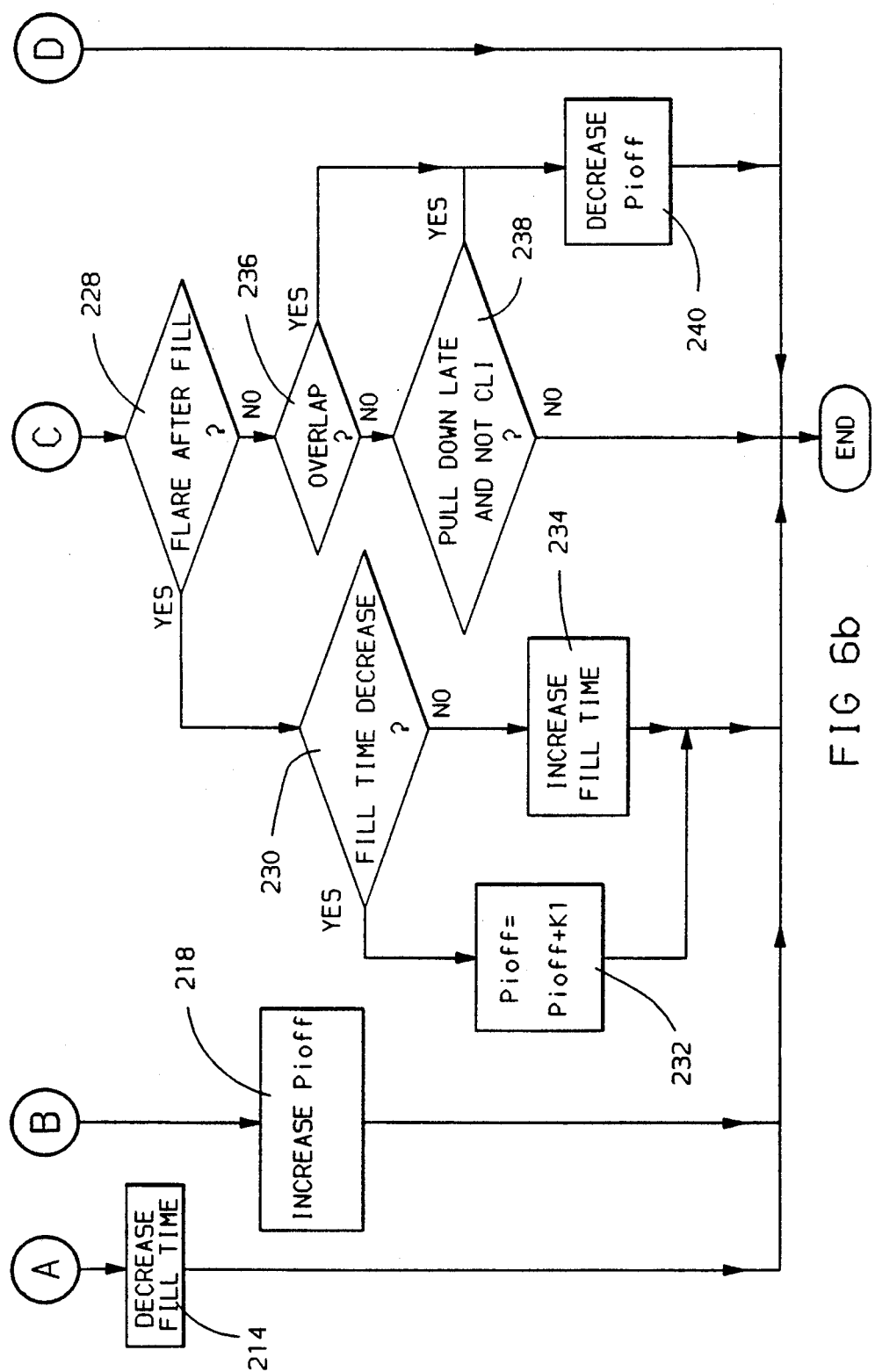
Figure 8:
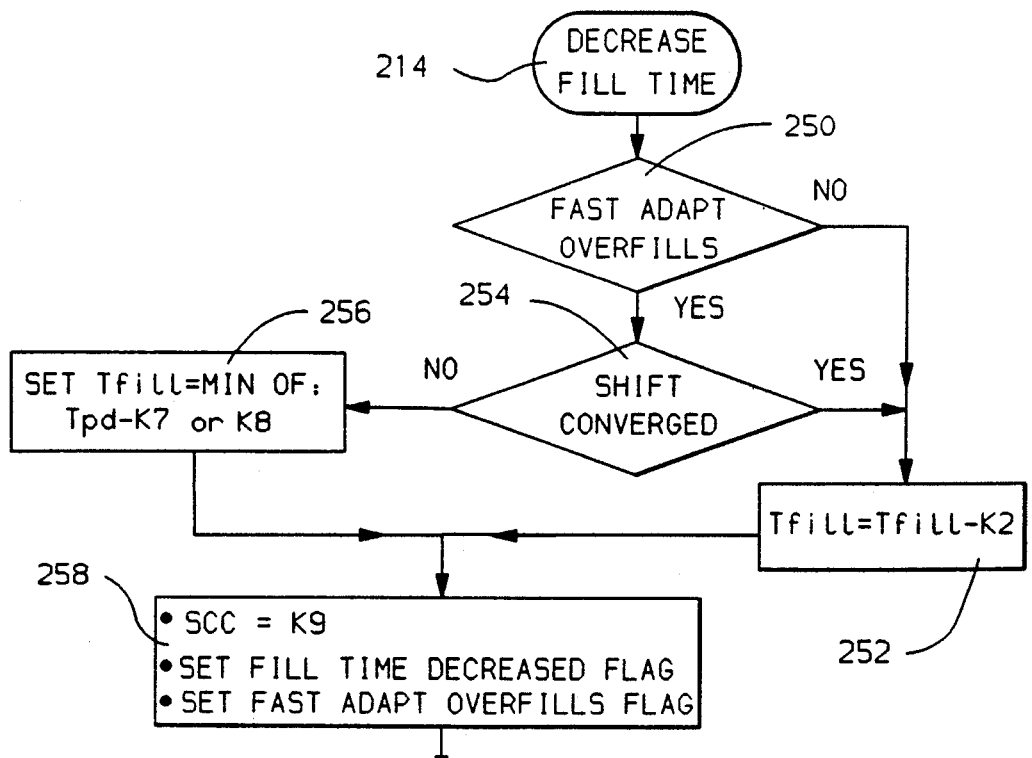

FIG. 8 is the flow chart for the decrease fill time routine 214 of FIG. 6b. If the FAST ADAPTIVE OVERFILLS (FAO) flag is not set <250>, the fill time is decremented by a small set amount K2 to carry out the slow adaptive mode. The same is true if the SHIFT CONVERGED FLAG is set <254>. When the FAO flag is set but the shift has not converged, the new fill time Tfill is calculated <256> as described above in reference to FIG. 7 to carry out the fast adaptive mode. Finally, regardless of whether fast or slow adaptive mode is chosen, the shift cycle counter SCC is set to a calibrated value K9, the FILL TIME DECREASED flag is set and the FAO flag is set <258>.

In the logic depicted in FIG. 6, the flare condition is dealt with in block 218 and blocks 226 through 234. If flare occurs during clutch fill time <226>, Pioff is too low and should be increased <218>. If flare occurs after fill time <228>, the fill time is too low and generally should be increased <234>. To prevent an overfill for borderline flare times (just after fill), a fill time increase soon after a decrease <214> is not allowed <230> and instead the initial off-going pressure Pioff is incremented <232> to manage the flare. This feature is implemented by the shift cycle counter, SCC, which is set to some number K9 by the decrease fill time routine <214> and sets the FILL TIME DECREASED <FTD> flag <258>. Then the increase fill time routine <234> can not be accessed until SCC is decremented to zero <200-204>.

Over time, a noise disturbance could cause the detection of an overfill and the targeting of a large decrease in the fill time. Consequently, the FAST ADAPTIVE OVERFILLS <FAO> flag has been defined to guard against erroneously decreasing the fill time and then requiring a number of shifts to reset the FTD flag to allow the correction of the fill time. Initially, the FAO flag is set so that overfills will be adapted using the fast adaptive algorithm. However, once a shift is done where an overfill is not detected through the PULL DOWN EARLY flag <210>, then the FAO flag will be reset <220>. If an overfill is detected after the FAO flag has been reset, then only a small decrease to the fill time will be allowed. The FAO flag will then be set so that if a second consecutive overfill is detected, the fast adaptive change will be used.

Figure 9:
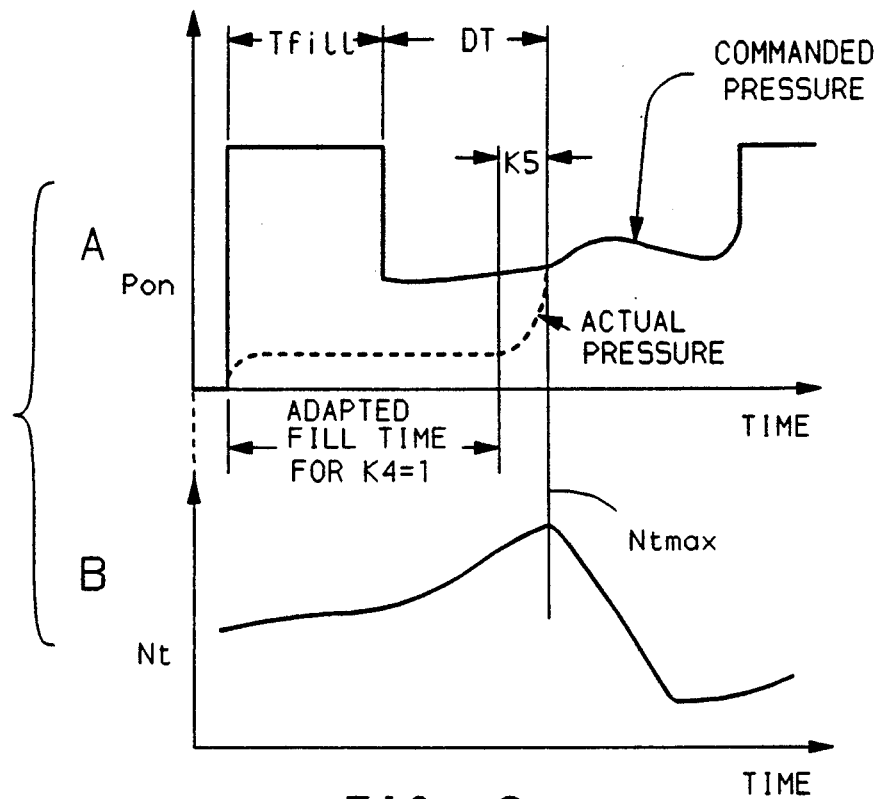

FIG. 9, graphs A and B, show commanded and actual on-coming pressure Pon and turbine speed Nt, respectively, for a condition of turbine speed flare after the fill period Tfill. The turbine speed Nt increases above that required to maintain the upper speed ratio and reaches a peak at time Ntmax. The difference DT between Tfill and Ntmax, is reduced by an offset, K5, multiplied by a fractional constant K4, and used as the fill time increase. The constant K4 is needed to prevent an over correction. A minimum adjustment is assured by using DT=K3, where K3 is a preset value. Thus, Tfill is updated according to the greater of:

$$Tfill+K4*(DT-K5)$$

or $$Tfill+K4*(K3-K5)$$

Figure 10:
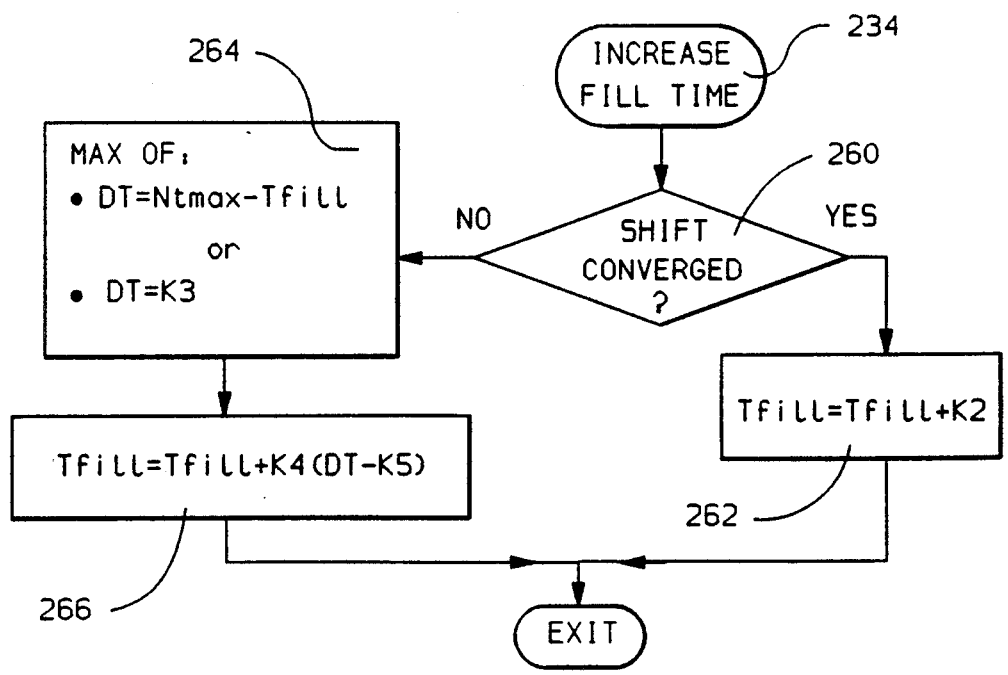

FIG. 10 shows the flow diagram for the increase fill time routine 234. If the shift has converged <260> the slow adaptive mode is used <262> but if it has not converged, DT is calculated <264> and the next Tfill is calculated <266>.

Figure 11:
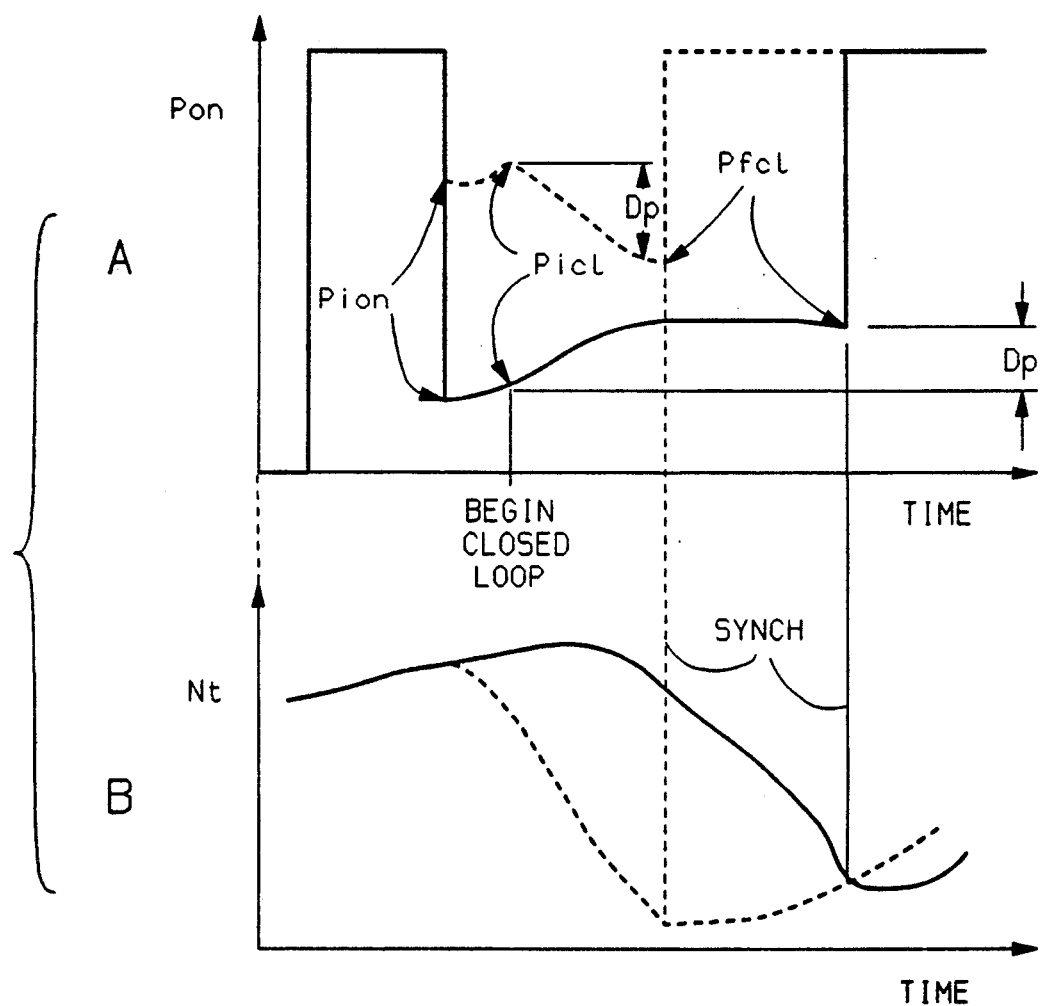

FIG. 11, graphs A and B, show commanded on-coming pressure Pon and turbine speed Nt, respectively. Traces corresponding to a condition of low initial on-coming pressure Pion are shown in solid lines and traces corresponding to a condition of high Pion are shown in dashed lines. If Pion is too low, the shift may be too long, and Pion should be increased. Likewise, a high Pion yields a short shift and Pion should be decreased. Even in the absence of a long or short shift, a closed-loop decrease reveals that the closed-loop operation had to lower the pressure; accordingly, it is desirable to reduce the initial on-coming pressure Pion so that the closed-loop control will not have to make that correction. Similarly, a closed-loop increase indicates that the Pion should be increased. The difference Dp between initial and final closed-loop pressures, or $$Dp=Pfc1-Pic1$$

is the basis for calculating the correction. An offset value K11 is subtracted from Pion to control the closed-loop pressure change to the value K11, thereby allowing the closed-loop increase or decrease to be programmed to the desired shape of the closed-loop pressure response.

Figure 12:
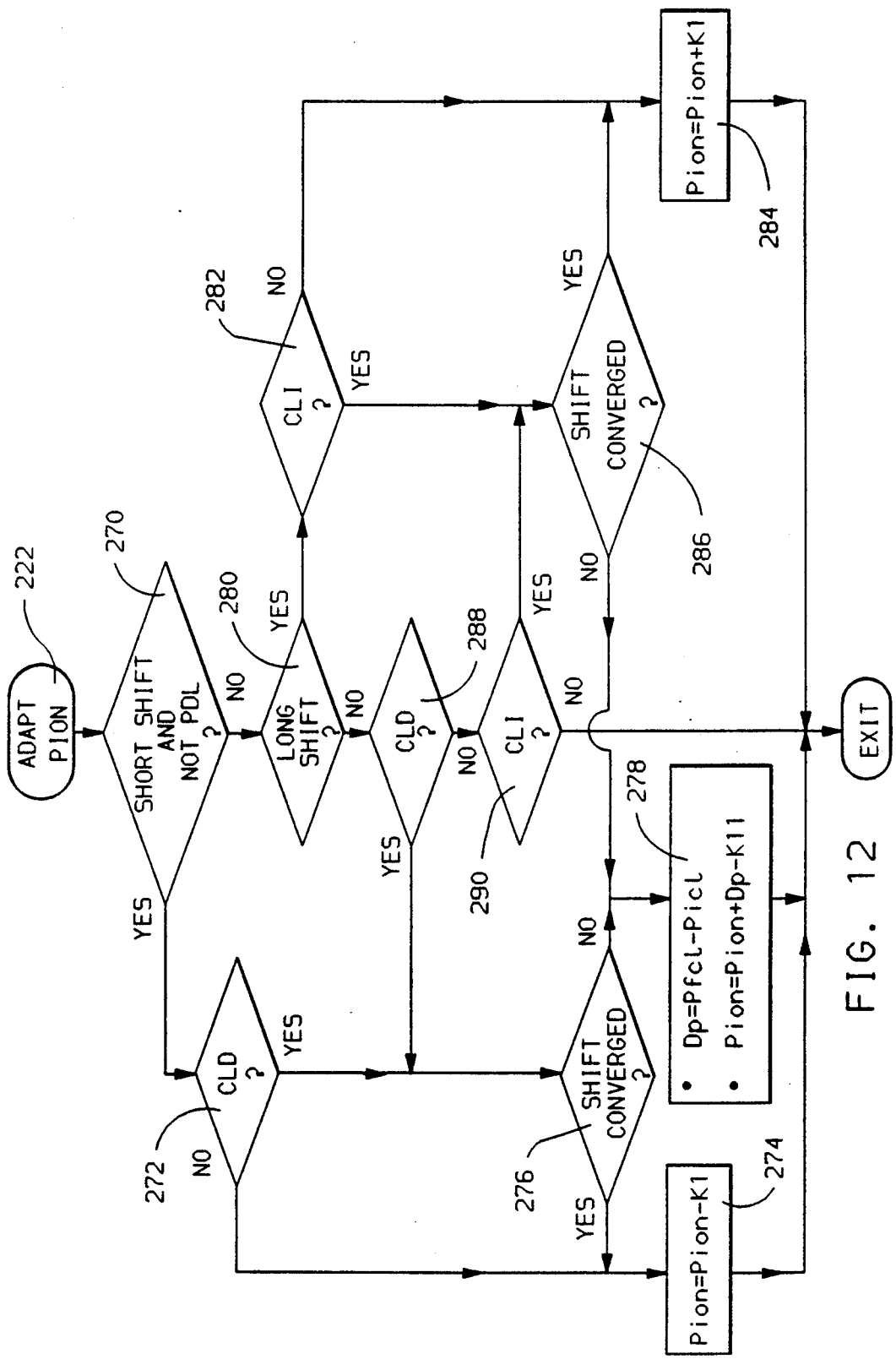

The adapt Pion routine 222 of FIG. 6a is detailed in FIG. 12. If the SHORT SHIFT flag is set and the PULL DOWN LATE (PDL) flag is not set <270>, and the CLOSED-LOOP DECREASE (CLD) flag is not set <272>, the slow adaptive mode is used to decrement Pion <274> by the constant K1. If CLOSED-LOOP DECREASE is set and the shift has converged <276>, the same slow adaptive mode is used. If the shift has not converged, the fast adaptive value is applied <278> as described above in reference to FIG. 11. If the LONG SHIFT flag is not set <280> and the CLOSED-LOOP INCREASE (CLI) flag is set <282>, the slow adaptive mode is used to increment Pion <284> by K1. If the CLOSED LOOP INCREASE flag is set and the shift has converged <286>, the same slow adaptive mode <284> is used, but if the shift has not converged, the fast adaptive is used <278>. Finally, if there is neither a short shift <270> nor a long shift <280> and there is a closed-loop decrease <288>, control passes to the shift converged block 276 to choose either a fast or slow adaptive decrease. If there is no closed-loop decrease <288> but there is a closed-loop increase <290>, the shift converged block 286 determines whether to make a fast or slow adaptive pressure increase.

An appropriate event occurring at the wrong time is a type of aberration which is used to diagnose a shift problem. The time that the off-going clutch releases is important since it results in flare if too early, or in excessive clutch overlap if too late. These events are all reflected in the turbine speed Nt.

Figure 13:
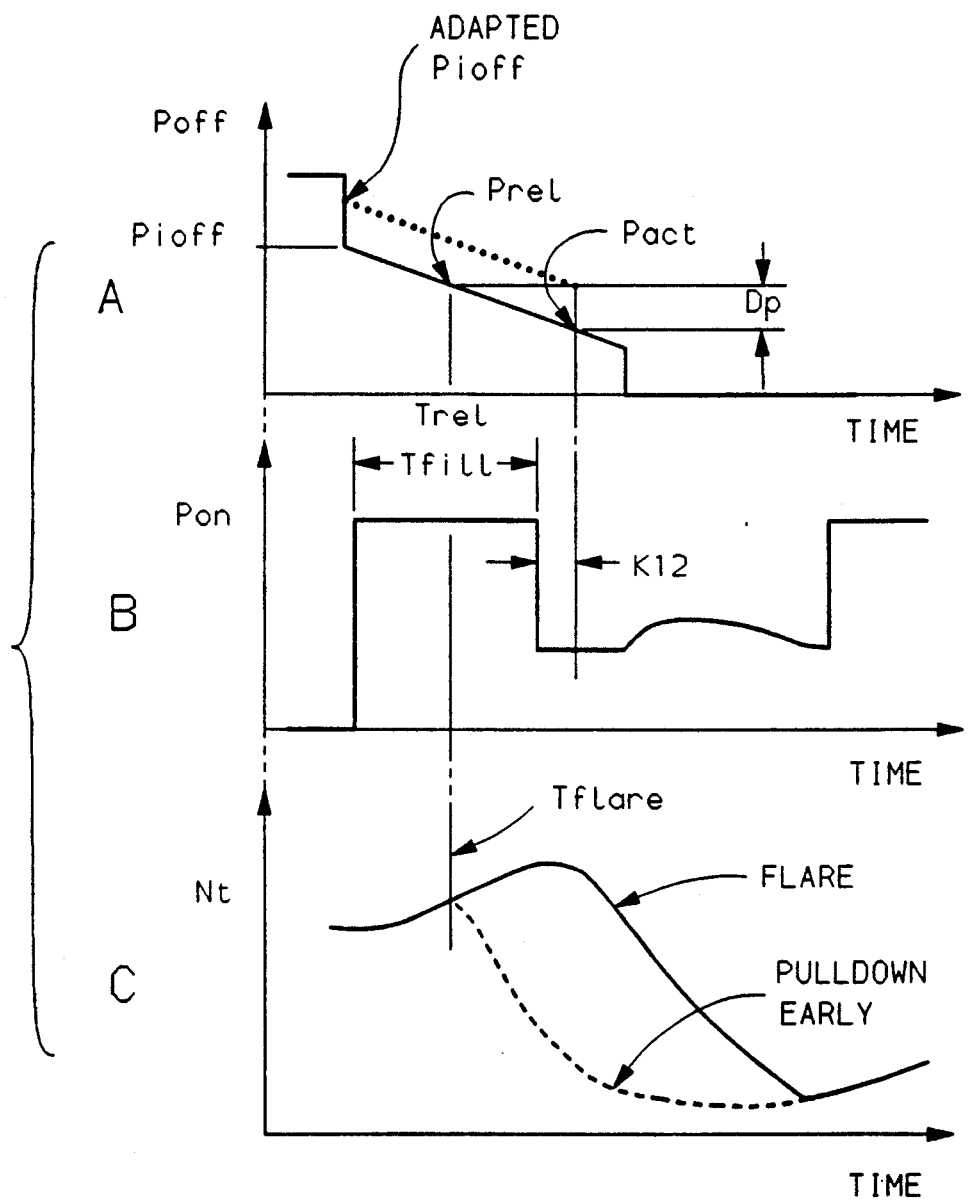

When the initial off-going pressure, Pioff, is too low and engine power is present, the off-going clutch releases too early and flare during fill time results. When no engine power is present, early pulldown occurs without HIGH SPEED TURBINE DECEL. The remedy is to increase the initial off-going pressure, Pioff. FIG. 13 graphs A, B and C, show off-going pressure Poff, on-coming pressure Pon, and turbine speed Nt, respectively. In graph C, flare is shown in solid lines and early pulldown is shown in dashed lines. The time of release Trel is the point the flare or the pulldown begins. The constant K12 is an offset after fill time Tfill such that (Tfill+K12) is the desired clutch release point.

According to the control, the off-going pressure Prel at the release time is recorded. The actual pressure, Pact, at the desired release point is subtracted from the release pressure, Prel so that Dp=Prel−Pact. Dp is assigned a minimum value K13. If the shift has not converged, a correction is made by increasing the initial off-going pressure Pioff by Dp to obtain a higher ramp pressure as shown by the dotted line in graph A. If a conservative correction is desired, a fraction of Dp may be used as the correction to assure that an over correction does not occur. If the shift has converged, a small pressure increment is added to the Pioff.

When Pioff is too high, the on-coming clutch cannot overcome the off-going clutch. As the off-going pressure continues to decrement, it finally reaches a value, Poff(Tpd), where the on-coming clutch can overcome the off-going and cause turbine pulldown. The adaptive algorithm will decrease the initial off-going pressure Pioff such that the next time the shift occurs, the off-going pressure will be at this value when the on-coming clutch has gained capacity. For clutch overlap, the on-coming clutch capacity occurs at the time when overlap was detected. However, if pulldown late is detected, then on-coming clutch capacity is assumed to occur just after the end of fill at t=Tfill+K15, where K15 is an offset.

Figure 14:
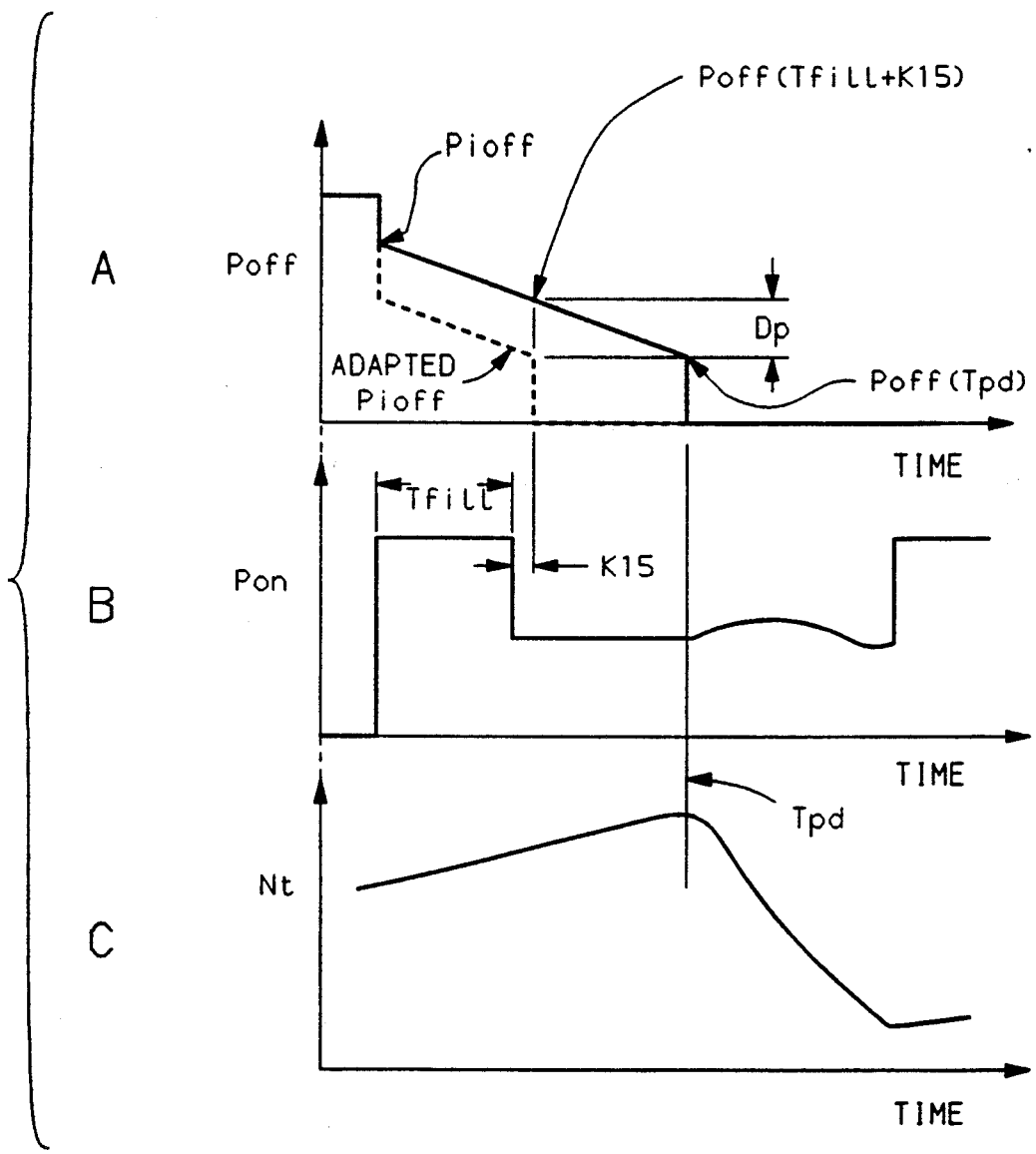

FIG. 14, graphs A, B and C, show the off-going commanded pressure Poff, the on-coming commanded pressure Pon and the turbine speed Nt respectively, for the case of late pulldown. The pressure at the pulldown time Poff(tpd) is subtracted from the pressure at the desired pulldown time Poff(Tfill+K15) to obtain the pressure difference Dp which is used to calculate the target correction for the fast adaptive mode.

Figure 15:
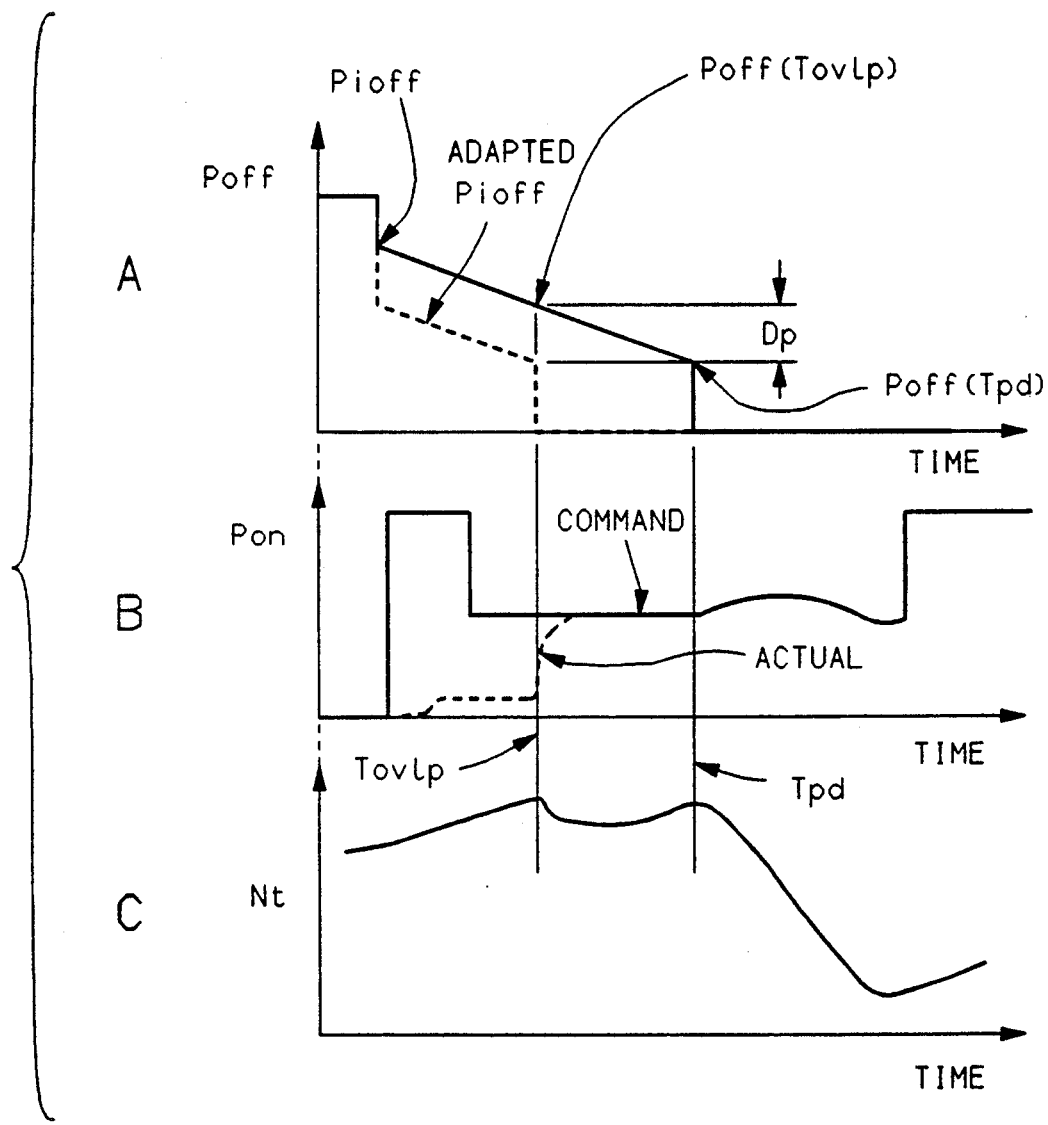

FIG. 15, graphs A, B and C, show the off-going commanded pressure Poff, the on-coming commanded pressure Pon and the turbine speed Nt, respectively, for the case of clutch overlap. The overlap occurs at time Tovlp while pulldown occurs at Tpd. The difference of pressures at those times Dp=Poff(Tovlp)−Poff(Tpd) is used to establish the target correction of the initial off-going pressure Pioff for the fast adaptive mode. The decrease Pioff routine 240 of FIG. 6b calculates the pressure difference in accordance with the state of the OVERLAP flag and requests at least a minimum value for fast adaptive mode; it then calculates the new initial pressure Pioff for the fast adaptive mode. The slow adaptive mode is selected if the shift has converged.

In each of the described fast adaptive routines, the correction value is calculated such that it will fully correct the related aberration on the next shift. As a design convenience, a percentage multiplier (such as the fractional constant K4 in FIG. 10) may be provided in each calculation to allow adjustment of the correction value. This is useful, for example, if the calculated correction for a particular type of transmission actually results in an over correction. Then a percentage of the correction could be specified rather than using the whole value.

While this invention has been described in reference to the illustrated embodiment, various modifications will occur to those skilled in the art. In this regard, it should be understood that systems incorporating such modifications may fall within the scope of the present invention which is defined by the appended claims.

The embodiments of the invention in which an exclusive property or privilege is claimed are defined as follows:

1. In a vehicular automatic transmission in which a shift from a first speed ratio to a second speed ratio is carried out through concurrent disengagement of a fluid pressure operated off-going torque transmitting device associated with the first speed ratio and engagement of a fluid pressure operated on-coming torque transmitting device associated with the second speed ratio, a method of automatically shifting the transmission, comprising the steps of:
   disengaging the off-going torque transmitting device by reducing its pre-shift engagement pressure,
   engaging the on-coming torque transmitting device by supplying it with hydraulic pressure according to a pressure command having a predetermined initial value, and thereafter initiating a closed-loop control of the pressure command based on a predefined pattern of input and output speeds chosen to yield high quality shifting, the pressure command achieving a final value upon completion of the closed-loop control;
   comparing a difference between said final value of the pressure command and the pressure command at the initiation of said closed-loop control with a threshold to detect an aberration; and
   if the difference exceeds said threshold, adjusting said predetermined initial value by an amount which is a function of the difference so that on the next shift the pressure command will have an initial value which is substantially correct for achieving the predefined pattern of input and output speeds.

2. In a vehicular automatic transmission in which a shift from a first speed ratio to a second speed ratio is carried out through concurrent disengagement of a fluid pressure operated off-going torque transmitting device associated with the first speed ratio and engagement of a fluid pressure operated on-coming torque transmitting device associated with the second speed ratio, a method of automatically shifting the transmission, comprising the steps of:
   disengaging the off-going torque transmitting device by reducing its pre-shift engagement pressure according to predetermined initial settings, and engaging the on-coming torque transmitting device by supplying it with hydraulic pressure according to predetermined initial settings, the settings being calibrated to achieve a predefined pattern of input and output speeds;
   comparing a measured speed with the predefined pattern to detect an aberration;
   so long as said aberration is detected, carrying out a fast adaptive adjustment of a stored parameter corresponding to the initial setting responsible for such aberration by calculating a change required to eliminate the aberration and altering the stored parameter in accordance therewith; and thereafter
   when said aberration is detected in a subsequent shift from the first speed ratio to the second speed ratio, adjusting said stored parameter by a predetermined increment to relatively slowly correct the corresponding setting.

3. The invention as defined in claim 2, wherein once a fast adaptive adjustment of said stored parameter is carried out and no aberration is detected is a subsequent shift, further fast adaptive adjustment is only permitted following the detection of an aberration in at least two later consecutive shifts.

4. In a vehicular automatic transmission in which a shift from a first speed ratio to a second speed ratio is carried out through concurrent disengagement of a fluid pressure operated off-going torque transmitting device associated with the first speed ratio and engagement of a fluid pressure operated on-coming torque transmitting device associated with the second speed ratio, a method of automatically shifting the transmission, comprising the steps of:
   disengaging the off-going torque transmitting device by reducing its pre-shift engagement pressure according to an off-going pressure command having a predetermined initial setting which decreases in ramp fashion to a final value;
   engaging the on-coming torque transmitting device by supplying it with hydraulic pressure according to predetermined initial settings, the settings being calibrated to achieve a predefined pattern of input and output speeds;
   sensing an event displaced in time from the predefined pattern which results from an incorrect off-going ramp pressure;
   comparing the final value of the off-going pressure command to the pressure command at a desired time of said event to derive a pressure difference; and
   adjusting a stored parameter corresponding to the initial setting of the off-going pressure command to change such initial setting by the pressure difference in a direction to correct the time of said event in a future shift.

5. The invention as defined in claim 4 including steps of:

inhibiting the derivation of said pressure difference and the corresponding adjustment of the stored parameter when a shift from said first speed ratio to said second speed ratio is performed without an aberration, and when an aberration is detected in a future shift form said first speed ratio to said second speed ratio, adjusting said stored parameter by a predetermined increment to relatively slowly correct the corresponding setting.

6. In a vehicular automatic transmission in which an upshift from transmission speed ratio to another is carried out through concurrent disengagement of a fluid pressure operated off-going torque transmitting device associated with the higher of such speed ratios and engagement of a fluid pressure operated on-coming torque transmitting device associated with the lower of such speed ratios, a method of automatically shifting the transmission, comprising the steps of:

disengaging the off-going torque transmitting device by reducing its pressure according to an off-going pressure command having a predefined initial setting, which thereafter progressively decreases to complete such disengagement;

engaging the on-coming torque transmitting device by successively supplying it with hydraulic pressure for a predefined fill period and thereafter controlling such pressure to effect a progressive engagement of the same;

monitoring input and output speeds of the transmission to detect an aberrant occurrence of a predefined speed event, adaptively adjusting a stored parameter corresponding to the predefined initial setting of the off-going torque transmitting device in a manner to increase such setting in response to the occurrence of a flare in the transmission input speed during the fill period in the on-coming torque transmitting device and indicative of low pressure in the off-going torque transmitting device; and adaptively adjusting said stored parameter in a manner to decrease such setting in response to the occurrence of an input speed change indicative of high pressure in the off-going torque transmitting device.

7. The invention as defined in claim 6 wherein the amount of decrease of the stored parameter is calculated as a function of a difference between the controlled pressure when the aberrant occurrence is detected and the controlled pressure when the speed event is expected to occur.

8. The invention as defined in claim 6 wherein the amount of increase of the stored parameter is calculated as a function of a difference between the controlled pressure when the aberrant occurrence is detected and the controlled pressure when the speed event is expected to occur.

9. The invention as defined in claim 6 including the step of:

adaptively adjusting a stored parameter corresponding to the predefined fill period for the on-coming torque transmitting device in a manner to increase such period in response to the occurrence of an input speed flare during the upshift but after the fill period.

10. The invention as defined in claim 9 wherein the fill period is increased in relation to a time interval between the occurrence of a maximum input speed and the end of the fill period.

11. The invention as defined in claim 6 including the steps of:

detecting pulldown during the fill period for the on-coming torque transmitting device where pulldown is evidenced by an input speed substantially less than the product of the transmission output speed and the higher speed ratio, and in response to the said detection of pulldown, adaptively adjusting a stored parameter corresponding to the said fill period in a manner to decrease such period.

12. The invention as defined in claim 11 wherein the fill period is decreased in relation to an interval between the time of pulldown and the end of the fill period.

13. In a vehicular automatic transmission in which an upshift from one transmission speed ratio to another is carried out through concurrent disengagement of a fluid pressure operated off-going torque transmitting device associated with the higher of such speed ratios and engagement of a fluid pressure operated on-coming torque transmitting device associated with the lower of such speed ratios, a method of automatically shifting the transmission, comprising the steps of:

disengaging the off-going torque transmitting device by reducing its pressure according to an off-going pressure command having a predefined initial setting, which thereafter progressively decreases to complete such disengagement;

engaging the on-coming torque transmitting device by successively supplying it with hydraulic pressure for a predefined fill period, commanding an initial on-coming pressure and thereafter controlling such pressure to effect a progressive engagement of the same including initiating a closed-loop period in which the commanded on-coming pressure is controlled according to a difference between a detected on-coming torque transmitting device slip rate and a programmed slip rate until an input speed of the transmission reaches a target value corresponding to an output speed of the transmission at the lower ratio;

adaptively adjusting a stored parameter corresponding to the initial pressure command following completion of the upshift in the event of a pressure increase wherein the commanded pressure when said input speed reaches said target value is greater than the commanded pressure at the initiation of the closed-loop period by a first threshold amount, and in the event of a pressure decrease wherein the commanded pressure when said input speed reaches said target value is less than the commanded pressure at the initiation of the closed-loop period by a second threshold amount, so that in future upshifts the initial pressure command will more nearly produce the programmed slip rate.

14. The invention as defined in claim 13 wherein the stored parameter is adjusted in relation to a difference between the commanded pressure when said input speed reaches said target value and the commanded pressure at the initiation of the closed-loop period.

15. In a vehicular automatic transmission in which an upshift from one transmission speed ratio to another is carried out through concurrent disengagement of a fluid pressure operated off-going torque transmitting device associated with the higher of such speed ratios and engagement of a fluid pressure operated on-coming torque transmitting device associated with the lower of such speed ratios, a method of automatically upshifting the transmission, comprising the steps of:

disengaging the off-going torque transmitting device by reducing its pressure according to an off-going pressure command having a predefined initial setting, which thereafter progressively decreases to complete such disengagement;

engaging the on-coming torque transmitting device by successively supplying it with hydraulic pressure for a predefined fill period, commanding an initial on-coming pressure and thereafter controlling such pressure to effect a progressive engagement of the same including initiating a closed-loop period in which the commanded on-coming pressure is controlled to bring a detected slip of the on-coming torque transmitting device into correspondence with a predefined slip vs. time profile designed to lower an input speed of the transmission to a target value corresponding to an output speed of the transmission at the lower ratio; and adaptively increasing a stored parameter corresponding to the initial pressure command for the on-coming torque transmitting device following completion of the upshift if the input speed falls substantially below the target value during the closed-loop period so that in future upshifts the input speed will more nearly achieve the target value at the end of the closed-loop period.

* * * * *